(12) United States Patent
Wamura

(10) Patent No.: US 10,793,432 B2
(45) Date of Patent: Oct. 6, 2020

(54) OUTPUT INSPECTION METHOD FOR OZONE MASS FLOW CONTROLLER

(71) Applicant: TOKYO ELECTRON LIMITED, Tokyo (JP)

(72) Inventor: Yu Wamura, Oshu (JP)

(73) Assignee: TOKYO ELECTRON LIMITED, Tokyo (JP)

(*) Notice: Subject to any disclaimer, the term of this patent is extended or adjusted under 35 U.S.C. 154(b) by 222 days.

(21) Appl. No.: 15/978,232

(22) Filed: May 14, 2018

(65) Prior Publication Data

US 2018/0334385 A1    Nov. 22, 2018

(30) Foreign Application Priority Data

May 18, 2017 (JP) ................... 2017-098819

(51) Int. Cl.
*C01B 13/02* (2006.01)
*C01B 13/11* (2006.01)
*C01B 13/00* (2006.01)

(52) U.S. Cl.
CPC .......... *C01B 13/0296* (2013.01); *C01B 13/00* (2013.01); *C01B 13/11* (2013.01); *C01B 2201/90* (2013.01)

(58) Field of Classification Search
CPC . C01B 13/0296; C01B 13/00; C01B 2201/90; C01B 13/11; C01B 2201/76; C01B 2201/14; C01B 2201/64; C01B 2201/40; C01B 13/10; B01J 19/088; B01J 2219/0805; B01J 2219/0807; B01J 2219/0894; B01J 4/008; B01J 2219/00038; B01J 2219/00162; B01J 2219/00164; B01J 19/18; G05D 11/138; G21B 3/00; G21C 3/623; Y02E 30/18; Y10T 137/0318
See application file for complete search history.

(56) References Cited

U.S. PATENT DOCUMENTS 9,295,967 B2 *  3/2016  Nakamura ............... C01B 13/11
2007/0020160 A1 *  1/2007  Berkman ................. C01B 13/11
                                                              422/186.14
2012/0219460 A1 *  8/2012  Okihara .................. B01J 19/088
                                                              422/111

FOREIGN PATENT DOCUMENTS

JP          5824062 B2    10/2015

* cited by examiner

*Primary Examiner* — Xiuyu Tai
(74) *Attorney, Agent, or Firm* — Nath, Goldberg & Meyer; Jerald L. Meyer

(57) ABSTRACT

A method includes: storing a first flow rate from an oxygen mass flow controller for supplying an oxygen with an ozone generator turned off and measuring a flow rate of the oxygen supplied to the ozone generator, and a second flow rate from at least one ozone mass flow controller provided in flow paths; supplying the ozone into a processing container via the flow paths to perform multiple times a predetermined ozone-based process; acquiring a third flow rate from the oxygen mass flow controller and a fourth flow rate from the at least one ozone mass flow controller, by supplying the oxygen with the ozone generator turned off during a predetermined period between the ozone-based processes; and determining whether the fourth flow rate is a normal value by comparing the first and second flow rates with the third and fourth flow rates, respectively.

10 Claims, 4 Drawing Sheets

FIG. 3

|  | $O_3$ | 10vol%$O_3$/$O_2$ | $O_2$ |
|---|---|---|---|
| Specific gravity (when air = 1) | 1.66 | 1.17 | 1.11 |
| Gas density [kg/m³] | 2.14 (0°C, 0.1MPa) | 1.50 | 1.43 (0°C, 0.1MPa) |

OUTPUT INSPECTION METHOD FOR OZONE MASS FLOW CONTROLLER

CROSS-REFERENCE TO RELATED APPLICATION

This application is based upon and claims the benefit of priority from Japanese Patent Application No. 2017-098819, filed on May 18, 2017, the entire contents of which are incorporated herein by reference.

TECHNICAL FIELD

The present disclosure relates to an output inspection method for an ozone mass flow controller.

BACKGROUND

A nitrogen-free ozone generation unit formed by combing a nitrogen-free ozone generator, an ozone power source and a control part related to the ozone generator in an integrated structure has been used. The control part is provided with a flow rate detection/flow rate adjustment part including a mass flow controller for controlling a flow rate of a raw material gas supplied to the nitrogen-free ozone generator, and a pressure detection/pressure adjustment part including an automatic pressure controller for automatically controlling an internal pressure of the nitrogen-free ozone generator.

In this way, the flow rate of the raw material gas supplied to the ozone generator is generally controlled by the mass flow controller.

In the conventional configuration, however, a mass flow controller is not particularly provided at the secondary side, i.e., the output side of the ozone generator. The reason for this is as follows. The mass flow controller measures a mass flow rate to perform a flow rate control. However, in the ozone generator, ozone generated from oxygen as a raw material is not 100% in concentration. The concentration of ozone varies in a range of 5 to 15 vol % $O_3/O_2$ depending on the performance of the ozone generator. Thus, the mass flow rate is naturally changed. This makes it impossible to install a mass flow controller used at a fixed concentration. In addition, the oxidizing power of ozone is very strong. Therefore, components of the mass flow controller corrode in a short period of time. For that reason, it is usual that the manufacturers and distributors of such a mass flow controller cannot guarantee the flow rate of an ozone mass flow controller and also cannot provide a period guarantee of a product.

Incidentally, in various industries, for example, in a semiconductor manufacturing industry, demand for constantly controlling a concentration and a flow rate of ozone is very high. For example, in a film forming process, ozone is used for depositing an oxide film on a substrate. In order to perform the same film formation under a constant film formation condition, a manufacturing process is performed with a constant concentration and flow rate of ozone in most cases.

SUMMARY

Some embodiments of the present disclosure provide an output inspection method for an ozone mass flow controller capable of precisely controlling a flow rate of ozone.

According to one embodiment of the present disclosure, there is provided an output inspection method for an ozone mass flow controller for controlling a flow rate of ozone to be supplied to a plurality of flow paths branched from an ozone generator, the method including: storing a first flow rate outputted by an oxygen mass flow controller configured to supply an oxygen with the ozone generator turned off and to measure a flow rate of the oxygen supplied to the ozone generator, and a second flow rate outputted by at least one ozone mass flow controller provided in the plurality of flow paths; supplying the ozone into a processing container from the ozone generator via the plurality of flow paths to perform a plurality of times a predetermined ozone-based process inside the processing container; acquiring a third flow rate outputted by the oxygen mass flow controller and a fourth flow rate outputted by the at least one ozone mass flow controller, by supplying the oxygen with the ozone generator turned off during a predetermined period between the predetermined ozone-based processes performed the plurality of times; and determining whether the fourth flow rate is a normal value by comparing the first flow rate and the second flow rate with the third flow rate and the fourth flow rate, respectively.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 3 is a view for explaining the reason why the calibration of the ozone mass flow controller is performed using an oxygen flow rate.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
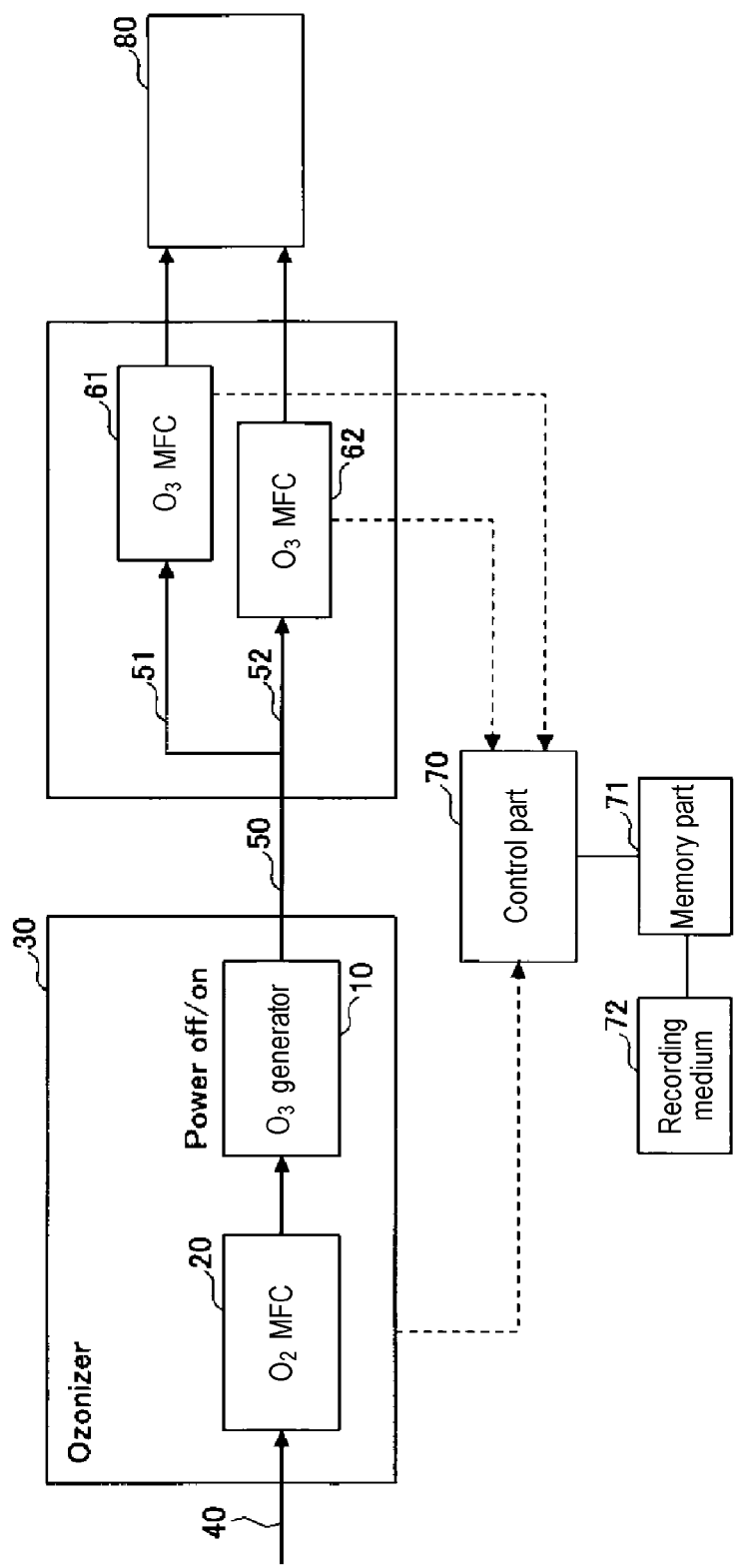
FIG. 1 is a view showing an example of an ozone flow rate control apparatus for implementing an output inspection method for an ozone mass flow controller according to an embodiment of the present disclosure.

FIG. 1 is a view showing an example of an ozone flow rate control apparatus for implementing an output inspection method for an ozone mass flow controller according to an embodiment of the present disclosure.

As shown in FIG. 1, the ozone flow rate control apparatus includes an ozonizer 30 provided with an ozone generator 10 and an oxygen mass flow controller (MFC) 20, an oxygen supply pipe 40, an ozone supply source pipe 50, ozone supply branch pipes 51 and 52, ozone mass flow controllers (MFCs) 61 and 62, a control part 70, a memory part 71, a recording medium 72, and a processing container 80.

The ozone generator 10 is a device for generating ozone from oxygen. The ozone generator 10 is not limited in configuration as long as it can generate ozone from oxygen as a raw material. A ratio of the ozone generated by the ozone generator 10 with respect to oxygen is 10 to 15 vol %, which may vary depending on the performance of the ozone generator 10. Therefore, ozone alone is not outputted from the ozone generator 10, but a mixed gas of oxygen and ozone is outputted.

The oxygen mass flow controller 20 is a flow rate control part for controlling a flow rate of oxygen supplied to the ozone generator 10. The oxygen mass flow controller 20 controls the flow rate by measuring a mass flow rate of oxygen. This eliminates the need to perform correction according to changes in ambient temperature, employed pressure, or the like, which makes it possible to measure and control oxygen with high precision in a reliable manner.

The ozonizer 30 is an ozone generation device obtained by integrating the ozone generator 10 and the oxygen mass flow controller 20 as a unit. In some embodiments, the ozone generator 10 and the oxygen mass flow controller 20 may not be integrated as a unit. The ozone generator 10 and the oxygen mass flow controller 20 may be provided independently of each other. In the present embodiment, an example will be described in which the ozone generator 10 and the oxygen mass flow controller 20 are integrated as the ozonizer 30.

The oxygen supply pipe 40 is a pipe for supplying oxygen as a raw material to the ozone generator 10. The oxygen mass flow controller 20 is provided in the oxygen supply pipe 40.

The ozone supply source pipe 50 and the ozone supply branch pipes 51 and 52 are pipes for supplying ozone (and oxygen) outputted from the ozone generator 10 to the processing container 80 and form a flow path of ozone. The ozone supply source pipe 50 is a pipe connected to a discharge port of the ozone generator 10. The ozone supply branch pipes 51 and 52 are ozone-supplying pipes branched from the ozone supply source pipe 50. The ozone supply branch pipes 51 and 52 are provided to supply ozone to a plurality of locations. The ozonizer 30 is expensive. Thus, when there is a need to supply ozone to a plurality of locations, such a branched structure may be employed. The output inspection method for an ozone mass flow controller according to the present embodiment is applied to an ozone supply device having such a branched structure.

The ozone mass flow controllers 61 and 62 are mass flow controllers provided in the ozone supply branch pipes 51 and 52, respectively. The ozone mass flow controllers 61 and 62 are similar to the oxygen mass flow controller 20 in configuration and control respective flow rates by measuring mass flow rates of ozone and oxygen. Ozone has strong oxidizing power. As such, a change in material such as corrosion or the like inside the ozone mass flow controllers 61 and 62 is fast and the state is likely to fluctuate. This makes it difficult to accurately know a concentration of the ozone discharged from the ozone generator 10. Therefore, it is difficult for the ozone mass flow controllers 61 and, 62 to accurately control the flow rate of ozone. For that reason, the output inspection method for an ozone mass flow controller according to the present embodiment accurately controls the ozone flow rate in cooperation with the oxygen mass flow controller 20, which will be described in detail later.

The control part 70 is a part for controlling all components such as the ozone generator 10, the oxygen mass flow controller 20, the ozone mass flow controllers 61 and 62, the processing container 80 and the like. The control part 70 may be configured as, for example, an arithmetic processing means composed of a computer.

A memory of the control part 70 stores a program for implementing the output inspection method for an ozone mass flow controller according to the present embodiment under the control of the control part 70. The program incorporates a group of steps for executing a predetermined process and is stored in the recording medium 72 such as a hard disk, a compact disk, a magneto-optical disk, a memory card, a flexible disk or the like. The program is read in the memory part 71 by a predetermined reading device and is installed on the control part 70. Further, the memory of the control part 70 may store a program for executing a predetermined process in the processing container 80. This program also incorporates a group of steps for executing the respective predetermined process and is stored in the recording medium 72 such as a hard disk, a compact disk, a magneto-optical disk, a memory card, a flexible disk or the like. As mentioned above, the program is read in the memory part 71 by a predetermined reading device and is installed on the control part 70.

The processing container 80 is a container for performing a predetermined process using ozone. For example, a substrate process using ozone may be performed on a substrate accommodated in the processing container 80. In the present embodiment, descriptions will be made on a case in which a film forming process of depositing an oxide film on a surface of the wafer accommodated in the processing container 80 is carried out. However, the film forming process is nothing more than one example. Various kinds of processes may be performed inside the processing container 80 as long as they are performed using ozone.

Next, the output inspection method for an ozone mass flow controller using such an ozone flow rate control apparatus will be described. As described above, an example in which the film forming process is performed on a wafer inside the processing container 80 will be described First, prior to performing the film forming process on a wafer, a preliminary step is performed which includes supplying oxygen to the ozone generator 10 in a state in which the ozone generator 10 is turned off, and storing a flow rate of oxygen outputted from the oxygen mass flow controller 20 and a flow rate of oxygen outputted from the ozone mass flow controllers 61 and 62. The flow rate of oxygen may be set to an arbitrary value by the oxygen mass flow controller 20. When oxygen is supplied to the ozone generator 10 with the ozone generator 10 turned off, the supplied oxygen is entirely outputted from the ozone generator 10 and flows to the ozone supply source pipe 50. Oxygen supplied to the ozone supply source pipe 50 is divided into the ozone supply branch pipes 51 and 52 and is supplied to the processing container 80 via the ozone mass flow controllers 61 and 62, respectively. By checking the flow rates of oxygen in the ozone mass flow controllers 61 and 62, it is possible to know the flow rates of oxygen outputted from the ozone mass flow controllers 61 and 62 in a normal state.

The flow rates of oxygen outputted form the oxygen mass flow controller 20 and the ozone mass flow controllers 61 and 62 are stored in the memory of the control part 70 or the memory part 71.

Subsequently, the wafer is loaded into the processing container 80 where the film forming process is performed on the wafer. The film forming process for the wafer is performed by supplying ozone into the processing container 80 so as to form an oxide film or the like on the wafer.

After the film forming process is repeated a predetermined number of lots, an inspection step is performed to check whether or not the flow rates of oxygen outputted from the ozone mass flow controllers 61 and 62 indicate normal values in the course of the film forming process. In the inspection step, oxygen is supplied to the ozone generator 10 with the ozone generator 10 turned off again. At this time, the flow rate of oxygen is adjusted by the oxygen mass flow controller 20. The flow rate of oxygen may be set to the same flow rate as that set in the preliminary step or may be set to different flow rates. In the present embodiment, for the ease of understanding, descriptions will be made on an example in which the flow rate of oxygen is set to the same flow rate as that in the preliminary step.

Oxygen is supplied at the same flow rate as that in the preliminary step and the flow rates of oxygen outputted from the ozone mass flow controllers 61 and 62 are checked. If the output values of the ozone mass flow controllers 61 and 62 are not largely changed from those in the preliminary step, the flow rates of oxygen outputted from the ozone mass flow controllers 61 and 62 are determined to be normal. On the other hand, when the output values of the ozone mass flow controllers 61 and 62 are largely different from those in the preliminary step, the output values of the ozone mass flow controllers 61 and 62 are determined to be abnormal. In some embodiments, whether the output values of the ozone mass flow controllers 61 and 62 are normal or abnormal may be determined by checking whether differences between the output values of the ozone mass flow controllers 61 and 62 in the preliminary step and output values of the ozone mass flow controllers 61 and 62 during the film forming process fall within a predetermined range. If the differences fall within the predetermined range, the output values of the ozone mass flow controllers 61 and 62 are determined to be normal, whereas if the differences falls outside the predetermined range, the output values of the ozone mass flow controllers 61 and 62 are determined to be not normal (abnormal). Such a determination process may be performed by the control part 70.

As described above, by using oxygen whose flow rate can be accurately checked, it is possible to determine whether or not the flow rate outputs of the ozone mass flow controllers 61 and 62 are appropriate. In the above description, for the sake of easy understanding, there has been described an example in which the flow rate of oxygen is fixed. However, in both the preliminary step and the inspection step, a plurality of oxygen flow rates may be measured and an approximate curve may be drawn. As a result, a more accurate inspection can be performed.

If the outputs of the ozone mass flow controllers 61 and 62 are determined to be abnormal, measures such as issuing an alarm or calibrating the ozone mass flow controllers 61 and 62 are taken. As a result, the calibration of the ozone mass flow controllers 61 and 62 can be performed again, and the film forming process can be resumed at an accurate ozone flow rate.

Figure 2:
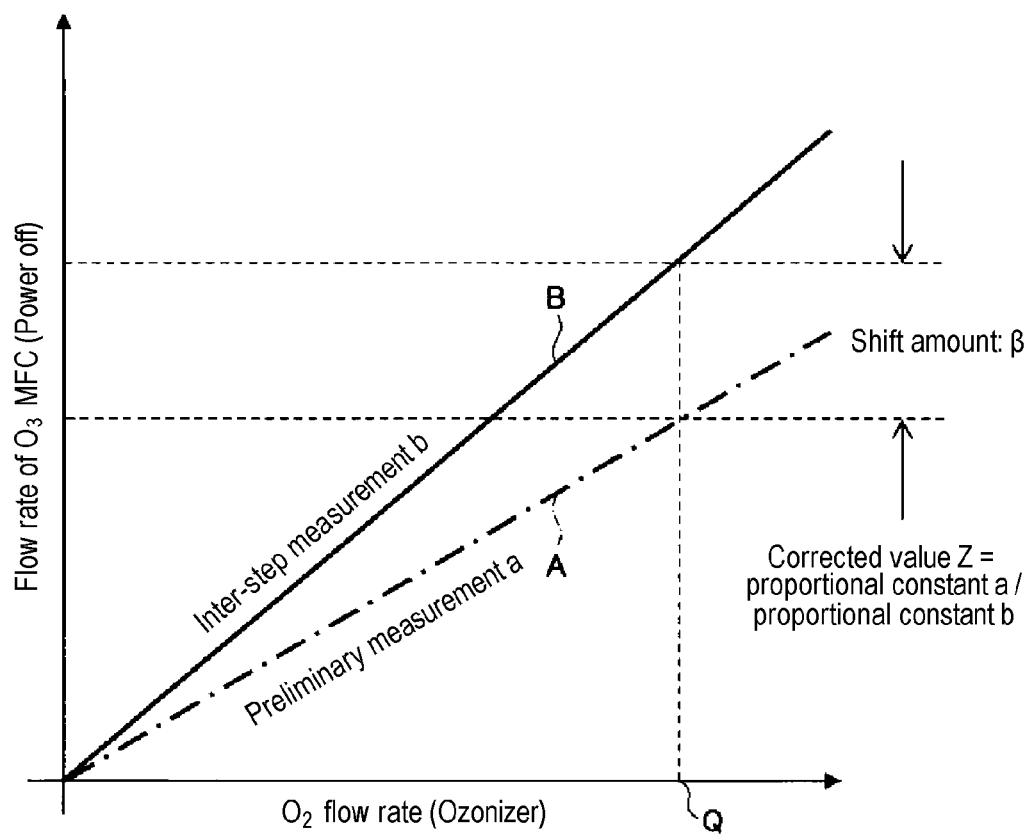
FIG. 2 is a view for explaining an example of a calibration method of the ozone mass flow controller.

FIG. 2 is a view for explaining an example of a calibration method of the ozone mass flow controllers 61 and 62.

As shown in FIG. 2, when oxygen is supplied with the ozone generator 10 turned off, a ratio of an increase in the outputs of the ozone mass flow controllers 61 and 62 with respect to an increase in the output of the oxygen mass flow controller 20, namely a proportional constant of the outputs of the ozone mass flow controllers 61 and 62 with respect to the output of the oxygen mass flow controller 20, is represented by lines A and B having inclinations a and b, respectively. The proportional constant a of the preliminary measurement in the preliminary step is increased to the proportional constant b of the inter-step measurement in the inspection step. In this case, if it is assumed that the flow rate of oxygen supplied in the film forming process step is Q, a shift amount of the ozone mass flow controllers 61 and 62 at the flow rate Q is β. Accordingly, the calibration of the ozone mass flow controllers 61 and 62 may be performed by allowing the proportional constant b to match or approach the proportional constant a with reference to the shift amount β.

As described above, from the relationship between the output of the oxygen mass flow controller 20 and the outputs of the ozone mass flow controllers 61 and 62, it can be determined whether the measurement outputs of the ozone mass flow controllers 61 and 62 are appropriate. If the measurement outputs are not appropriate, it is possible to know how much of a correction in the ozone mass flow controllers 61 and 62 is required. Thus, it is possible to calibrate the ozone mass flow controllers 61 and 62 so that they show accurate flow rates.

The calibration shown in FIG. 2 is merely an example. The calibration of the ozone mass flow controllers 61 and 62 may be performed by another calibration method.

In addition, the calibration of the ozone mass flow controllers 61 and 62 may be performed under the control of the control part 70, or may be performed by an operator.

FIG. 3 is a view for explaining the reason why the calibration of the ozone mass flow controllers 61 and 62 can be performed accurately even when the oxygen flow rate is used. Since the ozone mass flow controllers 61 and 62 are parts for measuring and controlling a flow rate of ozone, it is essentially desirable to perform the calibration of the ozone mass flow controllers 61 and 62 when ozone is allowed to flow. However, in the output inspection method for an ozone mass flow controller according to the present embodiment, the flow rate inspection of the ozone mass flow controllers 61 and 62 is performed using the oxygen flow rate and the calibration is performed using the oxygen flow rate because the mass flow controllers deteriorate in a short period of time due to the intensity of the oxidizing power of ozone and because sufficient calibration cannot be performed by ozone alone. Hereinafter, descriptions will be made on the reason why the calibrations of the ozone mass flow controllers 61 and 62 can be performed accurately even in the oxygen-based calibration.

In FIG. 3, specific gravities and gas densities of $O_3$, 10 vol % $O_3/O_2$, and $O_2$ are shown. Initially, a concentration of ozone discharged from the ozone generator 10 is 5 to 15 vol %, and the remaining 85 to 95% is occupied by oxygen. That is to say, the ozone generated by the ozone generator 10 is mainly composed of oxygen, and the specific gravity and the like thereof are quite close to those of oxygen. In FIG. 3, the specific gravity of 10 vol % $O_3/O_2$ is 1.17, which is closer to the specific gravity of oxygen, 1.11, than the specific gravity of ozone, 1.66. Furthermore, even in the gas density, the gas density of 10 vol % $O_3/O_2$ is 1.50, which is closer to the gas density of oxygen, 1.43, (under the condition of 0 degrees C. and 0.1 MPa) than the gas density of ozone, 2.14, (under the condition of 0 degrees C. and 0.1 MPa). Accordingly, the mass flow rate of the mixed gas of ozone and oxygen measured by the ozone mass flow controllers 61 and 62 is similar to the mass flow rate of oxygen alone. Even when the calibration is performed using an oxygen gas alone, it is possible to accurately calibrate the ozone mass flow controllers 61 and 62.

As described above, the output inspection method for an ozone mass flow controller according to the present embodiment makes use of the aforementioned property. Even when the output of the ozone mass flow controller cannot be inspected by ozone alone, the output inspection and calibration of the ozone mass flow controllers 61 and 62 can be accurately performed using oxygen.

Figure 4:
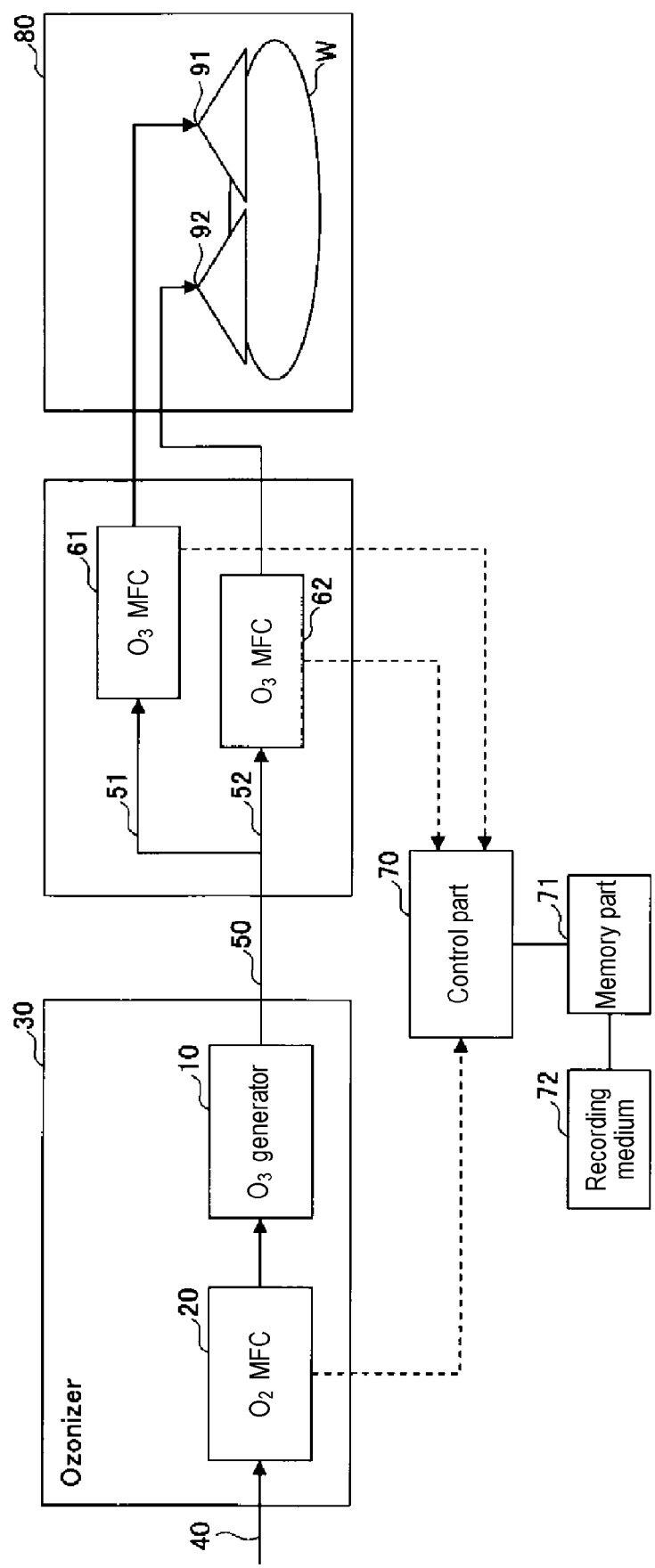
FIG. 4 is a view for explaining in more detail an example of a case where the output inspection method for an ozone mass flow controller according to the present embodiment is applied to a substrate processing process.

FIG. 4 is a view for explaining in more detail an example of a case where the output inspection method for an ozone mass flow controller according to the present embodiment is applied to a substrate processing process.

In FIG. 4, there is shown an example in which an ozone flow rate control apparatus is applied to a substrate processing apparatus. In FIG. 4, similar to FIG. 1, the ozone supply branch pipes 51 and 52 are branched from the ozone supply source pipe 50 connected to the ozone generator 10 of the ozonizer 30 and are respectively connected to the processing container 80. The ozone mass flow controllers 61 and 62 are provided in the ozone supply branch pipes 51 and 52, respectively. A wafer W is accommodated in the processing container 80, and ozone is supplied to the wafer W from each of ozone supply parts 91 and 92 to perform a substrate process.

In this regard, ozone is generated by a chemical formula of $3O_2 \rightarrow 2O_3$. Therefore, only two molecules of ozone are generated from three molecules of oxygen. Accordingly, the flow rate of oxygen supplied to the ozone generator 10 and the flow rate of ozone (and oxygen) outputted from the ozone generator 10 do not coincide with each other. That is to say, when the ozone generator 10 is turned on, the oxygen flow rate output of the oxygen mass flow controller 20 does not coincide with the sum of the flow rate outputs of the ozone mass flow controllers 61 and 62. The sum of the ozone (and oxygen) flow rate outputs of the ozone mass flow controllers 61 and 62 is always smaller than the oxygen flow rate output of the oxygen mass flow controller 20.

Accordingly, when the flow rate of the oxygen mass flow controller 20 is set to 5 slm, if it is assumed that the flow rate of the ozone mass flow controller 61 is set to 3 slm and the flow rate of the ozone mass flow controller 62 is set to 2 slm, the ozone flow rate is not 5 slm in total. Therefore, a flow rate control valve of the ozone mass flow controller 62 is controlled to be fully opened. Even in this case, ozone cannot be outputted at the set flow rate, as a result of which hunting occurs.

Therefore, in order to avoid such a situation, one of the ozone mass flow controllers 61 and 62 is used as a main mass flow controller to set a necessary flow rate, and the other is used as an auxiliary mass flow controller. The auxiliary mass flow controller does not set a flow rate but is set to supply a surplus ozone other than the set flow rate of the main mass flow controller. Thus, it is possible to prevent hunting. This enables the main mass flow controller to accurately supply ozone at the set flow rate.

For this reason, in FIG. 4, for example, the ozone mass flow controller 61 is set as a main mass flow controller, and the ozone mass flow controller 62 is set as an auxiliary mass flow controller. When the flow rate of the oxygen mass flow controller 20 is 5 slm, the flow rate of the ozone mass flow controller 61 is set to 4 slm, and a flow rate adjustment valve of the ozone mass flow controller 62 is throttled instead of setting the flow rate of the ozone mass flow controller 62 so that the ozone mass flow controller 62 supplies the surplus ozone exceeding 4 slm not supplied by the ozone mass flow controller 61. It is therefore possible to supply ozone into the processing container 80 at an accurate flow rate without causing hunting.

In FIG. 4, there is illustrated a case where only the two ozone supply branch pipes 51 and 52 are provided. However, the ozone supply branch pipes 51 and 52 may be formed of three or more arbitrary number (n) of ozone supply branch pipes depending on the capacity of the ozone generator 10, and the ozone mass flow controllers 61 and 62 may be arranged to correspond to the number of ozone supply branch pipes. Even in that case, by setting flow rates of (n−1) ozone supply branch pipes to the flow rate of the main mass flow controller so that the total flow rate becomes smaller than the flow rate of the oxygen mass flow controller 20, and by setting the other ozone supply branch pipe as an auxiliary mass flow controller for flow rate adjustment whose flow rate is not set and throttling a flow rate adjustment valve of the auxiliary mass flow controller, it is possible for the (n−1) ozone supply branch pipes to supply ozone at accurate flow rates.

The calibration of the ozone mass flow controllers 61 and 62 is as described above. During the substrate process, the ozone generator 10 is stopped. While supplying oxygen, the output of the oxygen mass flow controller 20 and the output of the ozone mass flow controller 61 serving as a main mass flow controller are measured and compared with the output of the oxygen mass flow controller 20 and the output of the ozone mass flow controller 61 measured in the preliminary step, thereby inspecting whether or not the output of the ozone mass flow controller 61 is correct. At that time, the ozone mass flow controller 62 serving as an auxiliary mass flow controller may or may not be inspected. The ozone mass flow controller 62 may be inspected in order to grasp the correct state of the auxiliary mass flow controller as well. In addition, in the case where the output inspection is not performed with respect to the auxiliary mass flow controller, a configuration may be adopted in which only the valves are arranged without disposing the mass flow controller.

In addition, the inspection step may be performed at any time in the course of the substrate process as long as there is no problem with the ozone generator 10 being turned off. As an example, the number of times of continuously performing the substrate process may be determined in advance, and the inspection step may be performed each time.

According to the output inspection method for an ozone mass flow controller according to the present embodiment, it is possible to inspect the ozone mass flow controllers 61 and 62 without stopping the substrate processing step during a period between substrate processing processes at which the substrate is unloaded from the processing container 80. This makes it possible to enhance the productivity. In addition, when there is a problem with the outputs of the ozone mass flow controllers 61 and 62, it is possible to perform the calibration of the ozone mass flow controllers 61 and 62 and to restore the normal state. This makes it possible to perform a substrate process with an accurate supply flow rate of ozone and to enhance the quality of the substrate process.

As described above, the substrate process may include a process other than the film forming process, or may include various processes as long as they are ozone supplying processes other than the substrate process.

According to the present disclosure in some embodiments, it is possible to accurately control a flow rate of ozone.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An output inspection method for at least one ozone mass flow controller for controlling a flow rate of ozone to be supplied to a plurality of flow paths branched from an ozone generator, the method comprising:
storing a first flow rate outputted by an oxygen mass flow controller configured to supply an oxygen with the ozone generator turned off and to measure a flow rate of the oxygen supplied to the ozone generator, and a second flow rate outputted by the at least one ozone mass flow controller provided in the plurality of flow paths;
supplying the ozone into a processing container from the ozone generator via the plurality of flow paths to perform a plurality of times a predetermined ozone-based process inside the processing container;
acquiring a third flow rate outputted by the oxygen mass flow controller and a fourth flow rate outputted by the at least one ozone mass flow controller, by supplying the oxygen with the ozone generator turned off during a predetermined period between the predetermined ozone-based processes performed the plurality of times; and
determining whether the fourth flow rate is a normal value by comparing the first flow rate and the second flow rate with the third flow rate and the fourth flow rate, respectively.

2. The method of claim 1, wherein the step of determining whether the fourth flow rate is the normal value is performed by determining whether a difference between the second flow rate and the fourth flow rate falls within a predetermined range when the first flow rate and the third flow rate are set to be substantially identical to each other.

3. The method of claim 1, further comprising:
issuing an alarm when the fourth flow rate is determined to be not the normal value.

4. The method of claim 1, further comprising:
calibrating the at least one ozone mass flow controller when the fourth flow rate is determined to be not the normal value.

5. The method of claim 1, wherein the at least one ozone mass flow controller includes a plurality of ozone mass flow controllers provided in each of the plurality of flow paths, and
the plurality of ozone mass flow controllers include, in addition to the at least one ozone mass flow controller storing the second flow rate, a single ozone mass flow controller for flow rate adjustment whose flow rate is not set.

6. The method of claim 5, wherein the sum of flow rates set in the at least one ozone mass flow controller storing the second flow rate except for the single ozone mass flow controller for flow rate adjustment is smaller than a flow rate set in the oxygen mass flow controller.

7. The method of claim 1, wherein the predetermined ozone-based process is a substrate process of processing a substrate accommodated in the processing container.

8. The method of claim 7, wherein the substrate process is a film forming process of forming a film on the substrate.

9. The method of claim 1, wherein the predetermined period between the predetermined ozone-based processes performed the plurality of times is a period after the predetermined ozone-based process is performed a predetermined number of times.

10. The method of claim 9, wherein the step of acquiring the third flow rate and the fourth flow rate is repeated at each of the predetermined number of times.

* * * * *